United States Patent
Zatorski et al.

(10) Patent No.: US 11,894,738 B2
(45) Date of Patent: Feb. 6, 2024

(54) TURBOMACHINE EQUIPPED WITH AN EMBEDDED ELECTRIC MACHINE HAVING A SEGMENTED AND MOVABLE STATOR

(71) Applicant: General Electric Company, Schenectady, NY (US)

(72) Inventors: Darek Tomasz Zatorski, Fort Wright, KY (US); Mohamed Osama, Garching (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/405,147

(22) Filed: Aug. 18, 2021

(65) Prior Publication Data

US 2022/0069688 A1 Mar. 3, 2022

Related U.S. Application Data

(60) Provisional application No. 63/072,471, filed on Aug. 31, 2020.

(51) Int. Cl.
*H02K 21/02* (2006.01)
*F02C 7/00* (2006.01)
(Continued)

(52) U.S. Cl.
CPC ............ *H02K 21/024* (2013.01); *F02C 7/00* (2013.01); *H02K 7/1823* (2013.01); *H02K 11/20* (2016.01);
(Continued)

(58) Field of Classification Search
CPC ...... H02K 21/024; H02K 11/20; H02K 11/30; H02K 7/1823; F02C 7/00; F05B 2220/323; F05B 2240/10; F05B 2240/24
See application file for complete search history.

(56) References Cited

U.S. PATENT DOCUMENTS

| 731,836 A | 6/1903 | Ash |
| 3,571,637 A | 3/1971 | Henningsen et al. |

(Continued)

FOREIGN PATENT DOCUMENTS

| EP | 2782215 A1 | 9/2014 |
| WO | WO2019/102057 A1 | 5/2019 |

OTHER PUBLICATIONS

Anonymous, "Variable air gap electric generator", Research Disclosure, Kenneth Mason Publications, UK, vol. 309, No. 101, Jan. 1, 1990, 2 pages.

*Primary Examiner* — Tulsidas C Patel
*Assistant Examiner* — Thomas K Quigley
(74) *Attorney, Agent, or Firm* — Dority & Manning, P.A.

(57) ABSTRACT

A turbomachine equipped with an embedded electric machine having a segmented and movable stator is provided. In one aspect, a turbomachine defines a radial direction and includes a rotating component, actuators, and an electric machine. The electric machine includes a rotor assembly rotatable with and operatively coupled with the rotating component. The electric machine also includes a stator assembly having a stator split into stator segments. Each one of the stator segments is movable by one of the actuators between a first position and a second position along the radial direction, the stator segments each being closer to the rotor assembly along the radial direction when in the first position than when in the second position.

19 Claims, 7 Drawing Sheets

(51) Int. Cl.
   *H02K 11/20* (2016.01)
   *H02K 11/30* (2016.01)
   *H02K 7/18* (2006.01)

(52) U.S. Cl.
   CPC ........ *H02K 11/30* (2016.01); *F05D 2220/323* (2013.01); *F05D 2240/10* (2013.01); *F05D 2240/24* (2013.01)

(56) References Cited

U.S. PATENT DOCUMENTS

| | | | | |
|---|---|---|---|---|
| 3,800,708 | A * | 4/1974 | English | B61B 13/04 104/291 |
| 4,093,882 | A * | 6/1978 | Furuta | H01M 50/40 310/90 |
| 4,235,153 | A | 11/1980 | Rinde et al. | |
| 4,594,849 | A * | 6/1986 | Kenison | F02C 9/28 701/100 |
| 4,641,080 | A * | 2/1987 | Glennon | H02P 9/40 310/152 |
| 5,300,848 | A | 4/1994 | Huss et al. | |
| 5,675,203 | A * | 10/1997 | Schulze | B60K 6/26 903/906 |
| 5,770,908 | A * | 6/1998 | Kim | H02K 21/24 310/90 |
| 5,834,872 | A * | 11/1998 | Lamb | H02K 49/046 310/90 |
| 5,955,809 | A * | 9/1999 | Shah | H02K 16/00 310/198 |
| 6,005,317 | A * | 12/1999 | Lamb | H02K 49/046 192/84.5 |
| 6,166,469 | A * | 12/2000 | Osama | H02K 16/00 310/90.5 |
| 6,211,591 | B1 * | 4/2001 | Kowalski | B25J 9/123 318/35 |
| 6,242,832 | B1 * | 6/2001 | Lamb | H02K 49/046 310/114 |
| 6,455,975 | B1 * | 9/2002 | Raad | H02K 7/125 310/51 |
| 6,469,412 | B1 * | 10/2002 | Patarchi | H02K 21/44 310/158 |
| 6,492,753 | B2 * | 12/2002 | Zepp | H02K 21/024 310/90 |
| 6,555,941 | B1 * | 4/2003 | Zepp | H02K 21/024 310/90 |
| 6,952,058 | B2 * | 10/2005 | McCoin | F03D 9/25 290/44 |
| 7,042,128 | B2 * | 5/2006 | Zepp | H02K 7/12 310/191 |
| 7,098,552 | B2 * | 8/2006 | McCoin | F03D 9/25 290/55 |
| 7,116,006 | B2 * | 10/2006 | McCoin | F03D 1/025 290/53 |
| 7,253,548 | B2 | 8/2007 | Dooley et al. | |
| 7,385,332 | B2 | 6/2008 | Himmelmann et al. | |
| 7,528,514 | B2 | 5/2009 | Cruz et al. | |
| 7,642,684 | B2 * | 1/2010 | Himmelmann | B60W 10/06 310/191 |
| 7,804,263 | B2 | 9/2010 | Himmelmann et al. | |
| 7,948,192 | B2 | 5/2011 | Himmelmann | |
| 8,269,389 | B1 * | 9/2012 | Somerville | H02K 21/12 310/191 |
| 8,294,404 | B2 * | 10/2012 | Stiesdal | H02K 1/187 310/90 |
| 8,354,768 | B2 | 1/2013 | Cipriani | |
| 8,740,543 | B2 * | 6/2014 | Weaver | F03D 7/0224 415/908 |
| 8,803,354 | B2 * | 8/2014 | Wamble, III | F03D 80/50 290/55 |
| 8,823,331 | B2 | 9/2014 | Lovejoy | |
| 9,197,112 | B2 * | 11/2015 | Stallinger | H02K 7/04 |
| 9,714,609 | B2 * | 7/2017 | French | F01D 15/10 |
| 9,825,510 | B2 * | 11/2017 | Coldwate | H02K 1/12 |
| 10,355,568 | B2 | 7/2019 | Gieras | |
| 10,978,934 | B2 | 4/2021 | Hon et al. | |
| 11,296,638 | B2 * | 4/2022 | McDonald | B63H 23/10 |
| 2002/0093262 | A1 * | 7/2002 | Zepp | H02K 21/024 310/90 |
| 2005/0082839 | A1 * | 4/2005 | McCoin | F03D 3/005 290/55 |
| 2005/0104469 | A1 * | 5/2005 | Zepp | H02K 11/21 310/191 |
| 2006/0006658 | A1 * | 1/2006 | McCoin | F03D 3/005 290/55 |
| 2006/0012182 | A1 * | 1/2006 | McCoin | H02K 7/1869 290/55 |
| 2007/0096581 | A1 * | 5/2007 | Zepp | H02K 21/024 310/191 |
| 2007/0241628 | A1 * | 10/2007 | Himmelmann | H02K 21/027 310/191 |
| 2008/0265702 | A1 * | 10/2008 | Yeh | H02K 21/026 310/90 |
| 2010/0013346 | A1 * | 1/2010 | Peek | H02K 16/04 310/156.08 |
| 2010/0213778 | A1 * | 8/2010 | Knutson | H02K 53/00 310/154.02 |
| 2010/0253272 | A1 * | 10/2010 | Stiesdal | H02K 1/12 310/90 |
| 2010/0264768 | A1 | 10/2010 | Alfermann et al. | |
| 2011/0025067 | A1 * | 2/2011 | Cipriani | H02K 1/18 310/209 |
| 2011/0200425 | A1 * | 8/2011 | Weaver | B66C 23/207 29/469 |
| 2011/0227523 | A1 * | 9/2011 | Grantz | H02P 25/024 318/724 |
| 2013/0002063 | A1 * | 1/2013 | Stallinger | B04B 9/146 310/51 |
| 2013/0322889 | A1 * | 12/2013 | Graf | H04B 10/80 398/141 |
| 2014/0091746 | A1 * | 4/2014 | Fujishima | H02K 16/00 318/538 |
| 2016/0036308 | A1 * | 2/2016 | Bailey | B60K 6/48 310/91 |
| 2016/0365760 | A1 * | 12/2016 | Yim | H02K 21/024 |
| 2018/0138761 | A1 * | 5/2018 | Niergarth | H02K 1/187 |
| 2018/0269737 | A1 | 9/2018 | Niergarth et al. | |
| 2019/0097479 | A1 | 3/2019 | Chong et al. | |
| 2019/0140495 | A1 | 5/2019 | Gajanayake | |
| 2019/0165708 | A1 * | 5/2019 | Smith | F02C 7/36 |
| 2020/0131908 | A1 * | 4/2020 | Luinaud | G01M 1/16 |
| 2020/0198792 | A1 | 6/2020 | Joshi et al. | |
| 2021/0152068 | A1 * | 5/2021 | Frantzheld | H02K 41/031 |
| 2021/0257949 | A1 * | 8/2021 | McDonald | H02K 21/024 |

\* cited by examiner

TURBOMACHINE EQUIPPED WITH AN EMBEDDED ELECTRIC MACHINE HAVING A SEGMENTED AND MOVABLE STATOR

CROSS REFERENCE TO RELATED APPLICATIONS

The present application claims the benefit of U.S. Provisional Patent Application Ser. No. 63/072,471, filed on Aug. 31, 2020, which is incorporated herein by reference in its entirety.

FIELD

The present subject matter relates generally to a turbomachine equipped with an embedded electric machine.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, downstream of the fan, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft propulsion systems, and aircraft incorporating such aircraft propulsion systems, it may be beneficial for the propulsion system to include an electric machine to, e.g., generate electrical power for various accessory systems of the gas turbine engines and/or the aircraft, for electric or hybrid electric propulsion devices, etc. One issue with permanent magnet electric machines is that in the event of a fault condition, such as a short within a stator coil, continued rotation of the rotor continues to generate a magnetic flux/electric flow through such fault, potentially creating high temperatures. When the electric machine is tied to an integral part of the aircraft propulsion system, such as a primary gas turbine engine, it may not be practical to shut down the gas turbine engine to prevent rotation of the rotor of the electric machine.

Accordingly, a propulsion system for an aircraft having an electric machine capable of addressing one or more of these issues would be useful.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Aspects of the present disclosure are directed to an electric machine having a segmented and movable stator, a turbomachine having such an electric machine embedded therein, and a method of operating such an electric machine. In one aspect, a turbomachine defines a radial direction and includes a rotating component, actuators, and an electric machine. The turbomachine can be an aviation gas turbine engine, for example. The rotating component can be one of a low pressure and a high pressure shaft or spool, for example. The electric machine includes a rotor assembly rotatable with and operatively coupled with the rotating component. The electric machine also includes a stator assembly having a stator split or segmented into stator segments. Each one of the stator segments is movable by one of the actuators between a first position and a second position along the radial direction. The stator segments are closer to the rotor assembly along the radial direction when in the first position than when in the second position. Moving the stator segments relative to the rotor assembly can prevent or mitigate damage when faults or failures associated with the electric machine are detected and can be used to control the amount of power extracted by the electric machine, among other benefits.

Figure 1:
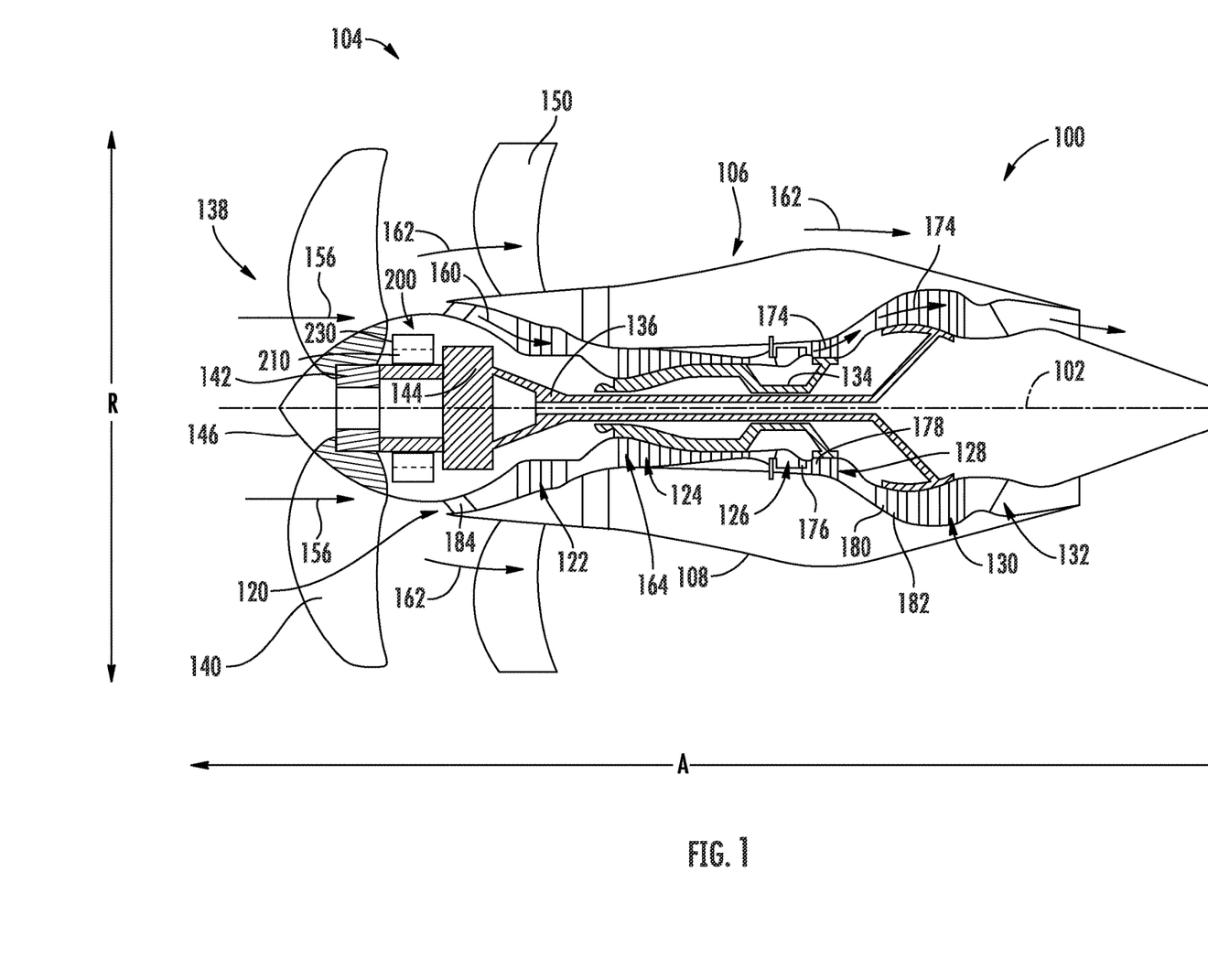
FIG. 1 is a schematic, cross-sectional view of a gas turbine engine in accordance with an exemplary aspect of the present disclosure.
Figure 2:
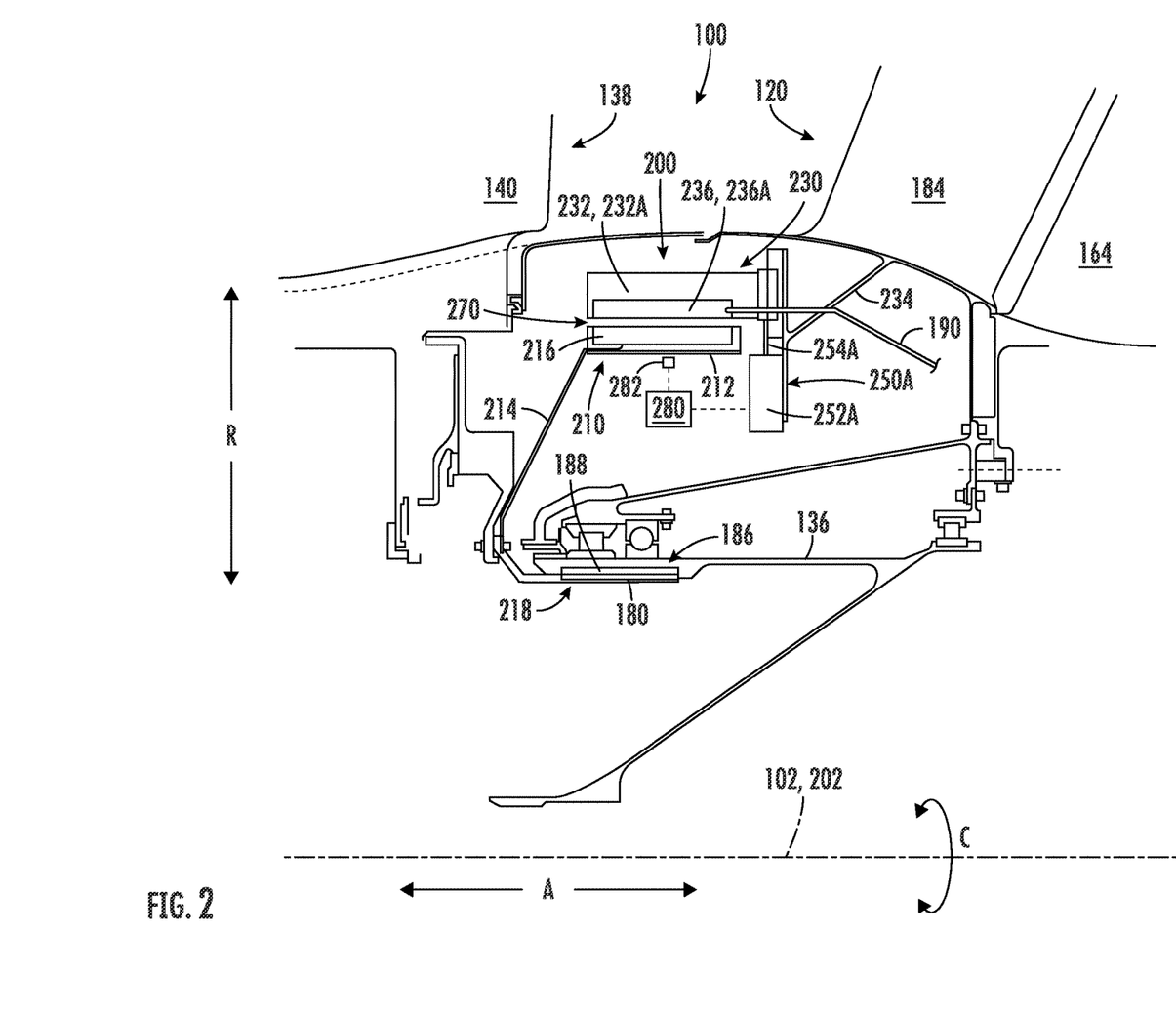
FIG. 2 is a schematic, cross-sectional view of an electric machine embedded in a gas turbine engine in accordance with an exemplary embodiment of the present disclosure and depicts a stator segment of the electric machine in a first position.

Referring now to the drawings, wherein identical numerals indicate the same elements throughout the figures, FIG. 1 is a schematic cross-sectional view of a propulsion engine in accordance with an exemplary embodiment of the present disclosure. In certain exemplary embodiments, the propulsion engine may be configured as a turbofan jet engine, herein referred to as "turbofan 100." The turbofan 100 can be incorporated into an aircraft propulsion system, e.g., as an under-wing mounted turbofan engine. Alternatively, however, in other embodiments, the turbofan 100 may be incorporated into any other suitable aircraft or propulsion system. As shown in FIG. 1, the turbofan 100 defines an axial direction A (extending parallel to a longitudinal centerline 102 provided for reference) and a radial direction R. The turbofan 100 also defines a circumferential direction C (FIG. 2).

The turbofan 100 includes a fan section 104 and a core engine 106 disposed downstream of the fan section 104. The core turbine engine 106 depicted includes a substantially tubular outer casing 108 that defines an annular core inlet 120. The outer casing 108 encases, in serial flow relationship, a compressor section including a booster or Low Pressure (LP) compressor 122 and a High Pressure (HP) compressor 124; a combustion section 126; a turbine section including an HP turbine 128 and an LP turbine 130; and a jet exhaust nozzle section 132. The compressor section, combustion section 126, and turbine section together define a core air flowpath 164 extending from the annular core inlet 120 through the LP compressor 122, HP compressor 124, combustion section 126, HP turbine section 128, LP turbine section 130, and jet nozzle exhaust section 132. An HP shaft or spool 134 drivingly connects the HP turbine 128 to the HP compressor 124. An LP shaft or spool 136 drivingly connects the LP turbine 130 to the LP compressor 122.

The fan section 104 includes a variable pitch fan 138 having a plurality of fan blades 140 coupled to a disk 142 in a spaced apart manner. As depicted, the fan blades 140 extend outward from the disk 142 generally along the radial direction R. The fan blades 140 and disk 142 are together rotatable about the longitudinal centerline 112 by the LP shaft 136 across a power gear box 144. The power gear box 144 includes a plurality of gears for adjusting the rotational speed of the LP shaft 136. Additionally, for the embodiment depicted, the disk 142 of the variable pitch fan 138 is covered by a rotatable spinner or front hub 146 aerodynamically contoured to promote an airflow through the plurality of fan blades 140.

The turbofan 100 also includes a plurality of circumferentially-spaced outlet guide vanes 150. The plurality of outlet guide vanes 150 are positioned downstream of the fan 138 along the axial direction A and extend outward from the outer casing 108 of the core engine 106 generally along the radial direction R. Notably, for the embodiment depicted in FIG. 1, the turbofan 100 does not include any outer fan casing enclosing the fan section 104 and/or outlet guide vanes 150. Moreover, the fan section 104 only includes a single fan. Accordingly, the turbofan 100 depicted in FIG. 1 may be referred to as an Unducted Single Fan (USF) turbofan.

For the exemplary turbofan 100 depicted, the fan section 104, or more particularly, the rotation of the fan blades 140 of the fan 138, provides a majority of the propulsive thrust of the turbofan 100. Additionally, the plurality of outlet guide vanes 150 are provided to increase an efficiency of the fan section 104 as well as to provide other benefits, such as decreasing an amount of noise generated by the turbofan 100, by directing a flow of air from the plurality of fan blades 140 of the fan section 104.

During operation of the turbofan 100, a volume of air 156 passes over the plurality of blades 140 of the fan section 104. A first portion of the volume of air 156, i.e., the first portion of air 160, is directed or routed into the core air flowpath 164 extending through the compressor section, the combustion section 126, the turbine section, and the exhaust section 132. Additionally, a second portion of the volume of air 156, i.e. a second portion of air 162, flows around the core engine 106, bypassing the core engine 106 (i.e., in a bypass air flowpath). The ratio between the second portion of air 162 and the first portion of air 160 is commonly known as a bypass ratio.

The pressure of the first portion of air 160 is increased as it is routed through the LP compressor 122 and subsequently through the HP compressor 124. The compressed first portion of air 160 is then provided to the combustion section 126, where it is mixed with fuel and burned to provide combustion gases 174. The combustion gases 174 are routed through the HP turbine 128 where a portion of thermal and/or kinetic energy from the combustion gases 174 is extracted via sequential stages of HP turbine stator vanes 176 that are coupled to the outer casing 108 and HP turbine rotor blades 178 that are coupled to the HP shaft 134. Extraction of thermal and/or kinetic energy from the combustion gases 174 causes the HP shaft 134 to rotate, thereby supporting operation of the HP compressor 124. The combustion gases 174 are then routed through the LP turbine 130 where a second portion of thermal and kinetic energy is extracted from the combustion gases 174 via sequential stages of LP turbine stator vanes 180 that are coupled to the outer casing 108 and LP turbine rotor blades 182 that are coupled to the LP shaft 136, thus causing the LP shaft or spool 136 to rotate, thereby supporting operation of the LP compressor 122 and/or rotation of the fan 138. The combustion gases 174 are subsequently routed through the jet exhaust nozzle section 132 of the core engine 106 to provide propulsive thrust to supplement propulsive thrust provided by the fan 138.

As further shown in FIG. 1, the exemplary turbofan 100 includes an electric machine 200 embedded therein. For this embodiment, the electric machine 200 is operatively coupled with the low pressure system of the turbofan 100, and more particularly, the LP shaft 136. The electric machine 200 includes a rotor assembly 210 and a stator assembly 230. The rotor assembly 210 is rotatable with one or more rotatable components of the turbofan 100. Specifically, for this embodiment, the rotor assembly 210 is mounted to and is rotatable with the LP shaft 136. Further, the electric machine 200 is arranged co-axially with the LP shaft 136. As used herein, "co-axially" refers to the axes being aligned. It should be appreciated, however, that in other embodiments, an axis of the electric machine 200 may be offset radially from the axis of the LP shaft 136. The rotor assembly 210 and the stator assembly 230 define an air gap 270 (FIG. 2) therebetween. As will be explained further below, the stator assembly 230 includes a stator split into stator segments that are each movable along the radial direction R relative to the rotor assembly 210 during certain operations.

It will be appreciated that the turbofan 100 depicted in FIG. 1 is provided by way of example only, and that in other exemplary embodiments, the turbofan 100 may have any other suitable configuration. For example, in other exemplary embodiments, the turbofan 100 may be configured as a turboprop engine, a turbojet engine, a differently configured turbofan engine, or any other suitable gas turbine engine. Additionally or alternatively, exemplary aspects of the present disclosure (such as the electric machine 200) may be incorporated into or otherwise utilized with any other suitable type of turbomachine, such as an aeroderivative gas turbine engine, a nautical gas turbine engine, a power generation gas turbine engine, an internal combustion engine, etc., or further with any other machine having rotating components.

Referring now to FIG. 2, a schematic, cross-sectional view of the electric machine 200 is provided. For this embodiment, the electric machine 200 is embedded within the turbofan 100 along the axial direction A aft of the fan 138 and forward of inlet guide vanes 184 positioned at the annular core inlet 120. However, it will be appreciated that in other exemplary embodiments that the electric machine 200 can be positioned at other suitable locations within the turbofan 100. Further, as shown, the electric machine 200 defines a centerline 202. For this embodiment, the centerline 202 is aligned with the longitudinal axis 102 of the turbofan 100.

As noted above, the electric machine 200 includes rotor assembly 210 and stator assembly 230. The rotor assembly 210 generally includes a rotor 212 and a rotor connection member 214. The stator assembly 230 includes a stator 232 and a stator connection member 234. The stator 232 is connected to and supported by the stator connection member 234. The rotor 212 of the rotor assembly 210 and stator 232 of the stator assembly 230 together define an air gap 270 therebetween. Moreover, for this embodiment, the rotor 212 includes a plurality of magnets 216, such as a plurality of permanent magnets, and the stator 232 includes a plurality of coils or windings 236. As such, it will be appreciated, that the electric machine 200 may be referred to as a permanent magnet electric machine. However, in other exemplary embodiments, the electric machine 200 may be configured in any suitable manner. For example, the electric machine 200 may be configured as an electromagnetic electric machine, including a plurality of electromagnets and active circuitry, as an induction type electric machine, a switched reluctance type electric machine, a synchronous AC electric machine, an asynchronous electric machine, or having any other suitable configuration.

For the embodiment shown, the rotor assembly 210 is operatively coupled with the LP shaft 136, and accordingly, the rotor assembly 210 is rotatable with the LP shaft 136. More specifically, as depicted, the rotor connection member 214 extends between the LP shaft 136 and the rotor 212 for connecting the rotor 212 to the LP shaft 136. For this embodiment, the rotor connection member 214 is connected to the LP shaft 136 through a splined connection. Particularly, the rotor connection member 214 includes a connection portion 218 having a plurality of teeth 220 arranged generally along the axial direction A, and similarly, the LP shaft 136 includes a connection portion 186 having a plurality of teeth 188 arranged generally along the axial direction A. The plurality of teeth 220 of the connection portion 218 of the rotor connection member 214 are configured to engage with the plurality of teeth 188 of the connection portion 186 of the LP shaft 136, fixing the two components to one another along the circumferential direction C. Notably, however, such a configuration allows for relative movement of the rotor assembly 210 relative to the LP shaft 136 along the axial direction A.

It will be appreciated that in other embodiments that the rotor connection member 214 may be coupled to the LP shaft 136 in any other suitable manner allowing for relative movement along the axial direction A, while fixing the components along the circumferential direction C. For example, in other example embodiments, the rotor connection member 214 may be coupled to the LP shaft 136 using a plurality of linear bearings, linear slides, etc.

During certain operations of the turbofan 100, the LP shaft 136 may rotate the rotor assembly 210 of the electric machine 200 relative to the stator assembly 230, allowing the electric machine 200 to function in a generator mode. Accordingly, during such operations, the electric machine 200 can generate electrical power. For this embodiment, the electric machine 200 is electrically coupled with a power bus 190. The power bus 190 can electrically couple or connect the electric machine 200 with various electrical sinks (accessory systems, electric/hybrid-electric propulsion devices, etc.), electrical sources (other electric machines, electric energy storage units, etc.), or both. In such a manner, electrical power generated by the electric machine 200 can be provided to such electrical sinks and/or sources. During some operations, the electric machine 200 may function in a drive mode. Accordingly, during such operations, the electric machine 200 can drive the LP shaft 136 about the longitudinal centerline 102.

Moreover, in some embodiments, the turbofan 100 can further include a cavity wall surrounding at least a portion of the electric machine 200. In some embodiments, the cavity wall can substantially completely surround the electric machine 200, extending from a location proximate a forward end of the electric machine 200 to a location aft of the electric machine 200. The cavity wall may function as, e.g., a cooling air cavity wall, a sump for cooling fluid, a protective cover for the electric machine 200, etc. For example, in certain embodiments, the engine may further include a second cavity wall (not shown) to form a buffer cavity surrounding the electric machine 200 and thermally protect the electric machine 200.

Figure 3:
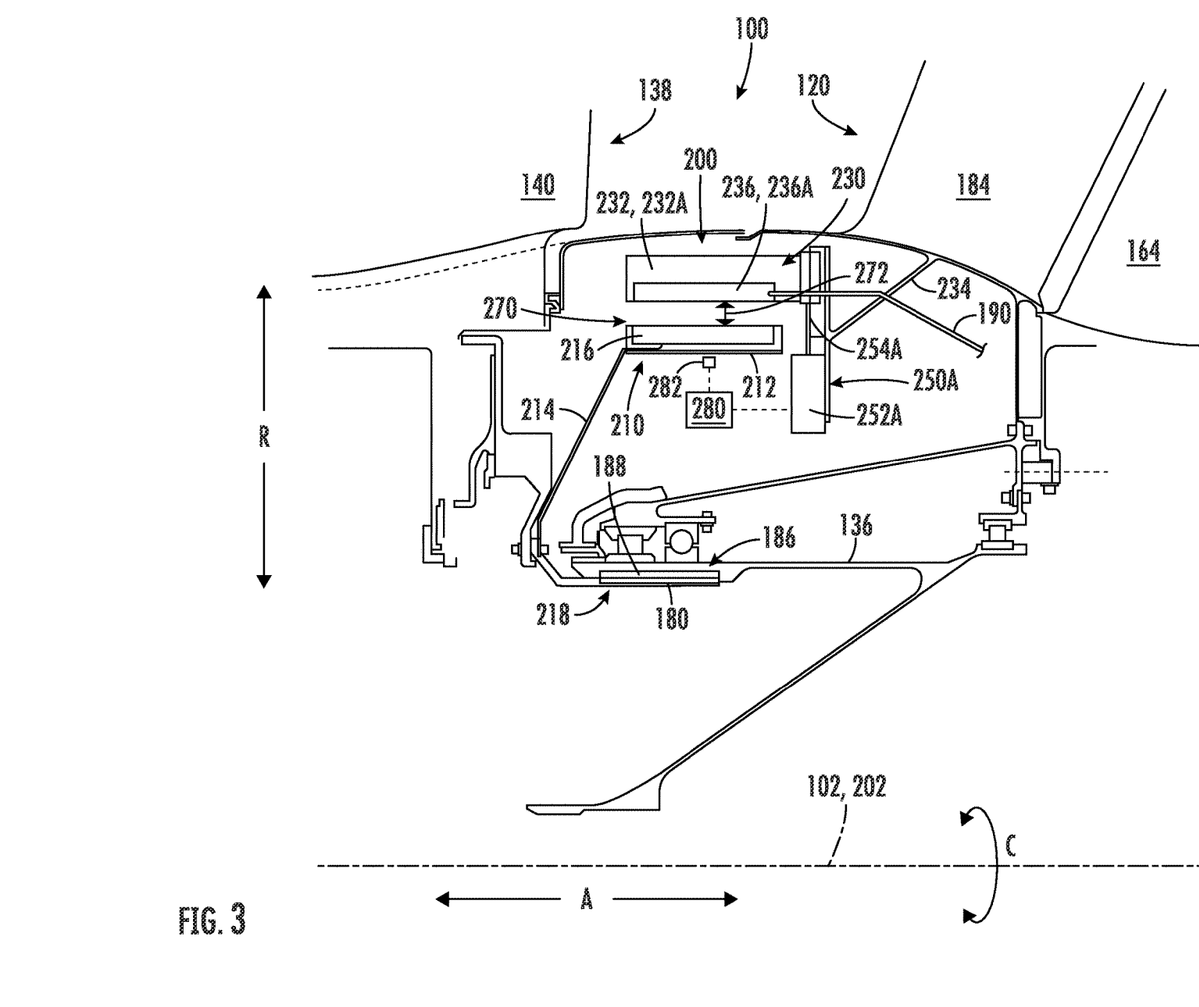
FIG. 3 is a schematic, cross-sectional view of the exemplary electric machine of FIG. 2 and depicts the stator segment of the electric machine in a second position.

Referring now to FIGS. 2, 3, 4, and 5, the stator assembly 230 will now be further described. As shown best in FIGS. 4 and 5, the stator 232 is split or segmented into stator segments. The stator 232 is split into at least two stator segments. The stator 232 can be split into any suitable number of stator segments. In some embodiments, for example, the stator 232 can be split into a first segment and a second segment. In other embodiments, the stator 232 can be split into at least four stator segments. For instance, for this embodiment, the stator 232 is split into four stator segments, including a first stator segment 232A, a second stator segment 232B, a third stator segment 232C, and a fourth stator segment 232D. Only the first stator segment 232A is depicted in FIGS. 2 and 3. The four stator segments 232A, 232B, 232C, 232D can be sized evenly or as equally sized segments as shown best in FIGS. 4 and 5.

Each one of the stator segments 232A, 232B, 232C, 232D has an associated set of stator windings or coils. Particularly, as shown best in FIGS. 4 and 5, the first stator segment 232A has a first set of stator windings 236A associated therewith, the second stator segment 232B has a second set of stator windings 236B associated therewith, the third stator segment 232C has a third set of stator windings 236C associated therewith, and the fourth stator segment 232D has a fourth set of stator windings 236D associated therewith. Notably, the stator windings of each set 236A, 236B, 236C, 236D are wound only within their respective stator segments 232A, 232B, 232C, 232D. This allows the stator segments 232A, 232B, 232C, 232D to be separately movable along the radial direction R as will be explained below. The stator windings 236A, 236B, 236C, 236D can be wound only within their respective stator segments 232A, 232B, 232C, 232D through slots defined between adjacent teeth of the stator segments 232A, 232B, 232C, 232D as shown in FIGS. 4 and 5.

Moreover, for this embodiment, the first set of stator windings 236A wound only within the first stator segment 232A include one or more windings associated with a first phase, one or more second windings associated with a second phase, and one or more third windings associated with a third phase. Accordingly, the first set of stator windings 236A is a three-phase set of windings. The second, third, and fourth sets of stator windings 236B, 236C, 236D wound only within their respective stator segments 232B, 232C, 232D can each be similarly wound as the first set of stator windings 236A. Accordingly, in this example, each stator segment 232A, 232B, 232C, 232D includes a set of three-phase windings 236A, 236B, 236C, 236D wound only within their respective stator segments 232A, 232B, 232C, 232D. It will be appreciated that the inventive aspects of the present disclosure may apply to any multiphase winding arrangement having any suitable number of phases, such as six phases. For instance, each stator segment can have an associated set of six-phase windings instead of an associated set of three-phase windings.

In some embodiments, the stator windings of a set associated with one of the stator segments can be arranged in a tooth or concentrated configuration. In such configurations, the go-side of a given winding is wound through a slot and the return-side of the given winding is wound through an adjacent slot. Thus, in a tooth or concentrated winding configuration, the stator windings go and return within the same stator segment and in slots that are spaced from one another by only a single slot (i.e., they are adjacent slots). The stator windings 236A, 236B, 236C, 236D are shown wound within their respective stator segments 232A, 232B, 232C, 232D in a tooth or concentrated winding configuration in FIGS. 4 and 5. In other embodiments, the stator windings can be arranged in a distributed configuration. In a distributed configuration, the stator windings go and return within the same stator segment and in slots that are spaced from one another by more than one slot. It will be appreciated that the winding configurations disclosed herein are non-limiting examples and that sets of stator windings associated with their respective stator segments can be wound in other suitable configurations.

Figure 4:
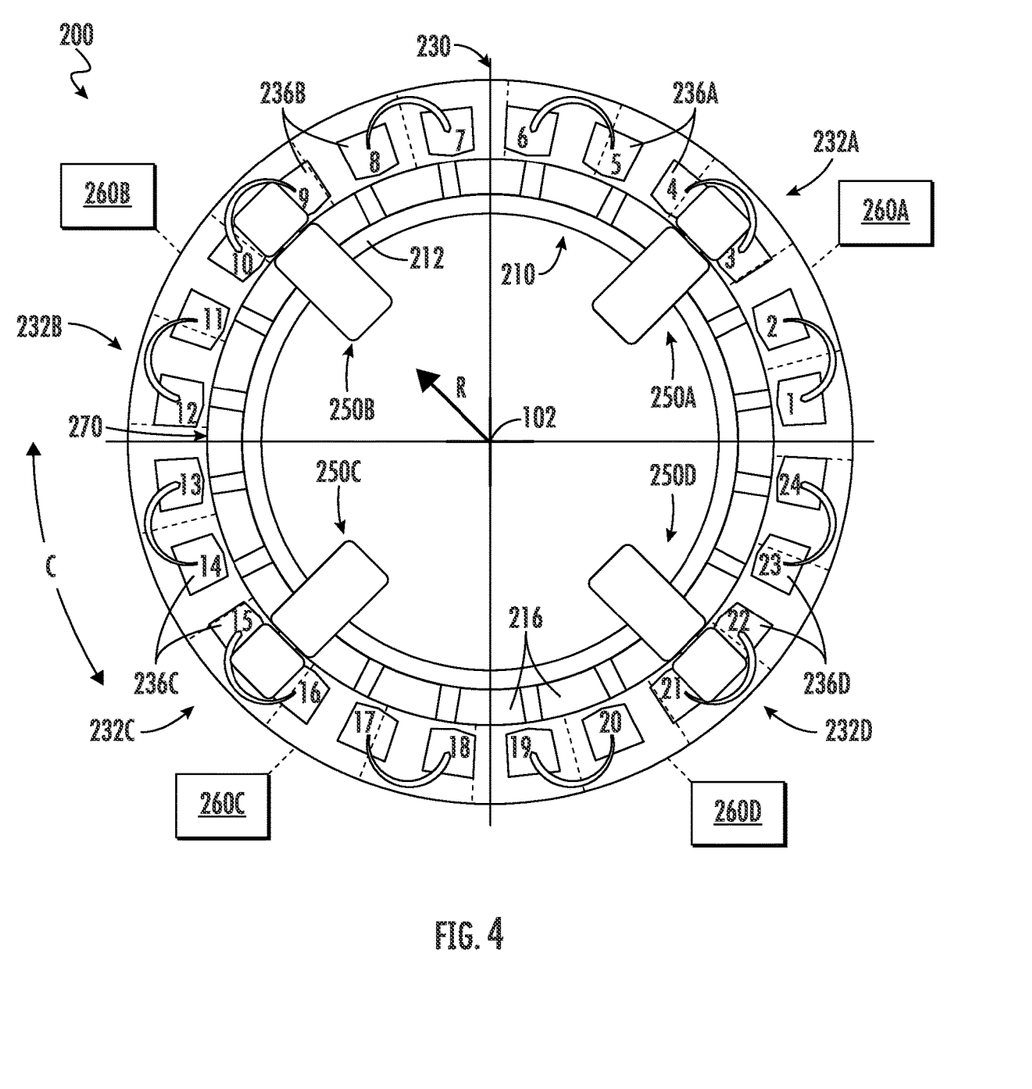
FIG. 4 is a schematic axial view of the electric machine of FIG. 2 depicting stator segments thereof in their respective first positions.
Figure 5:
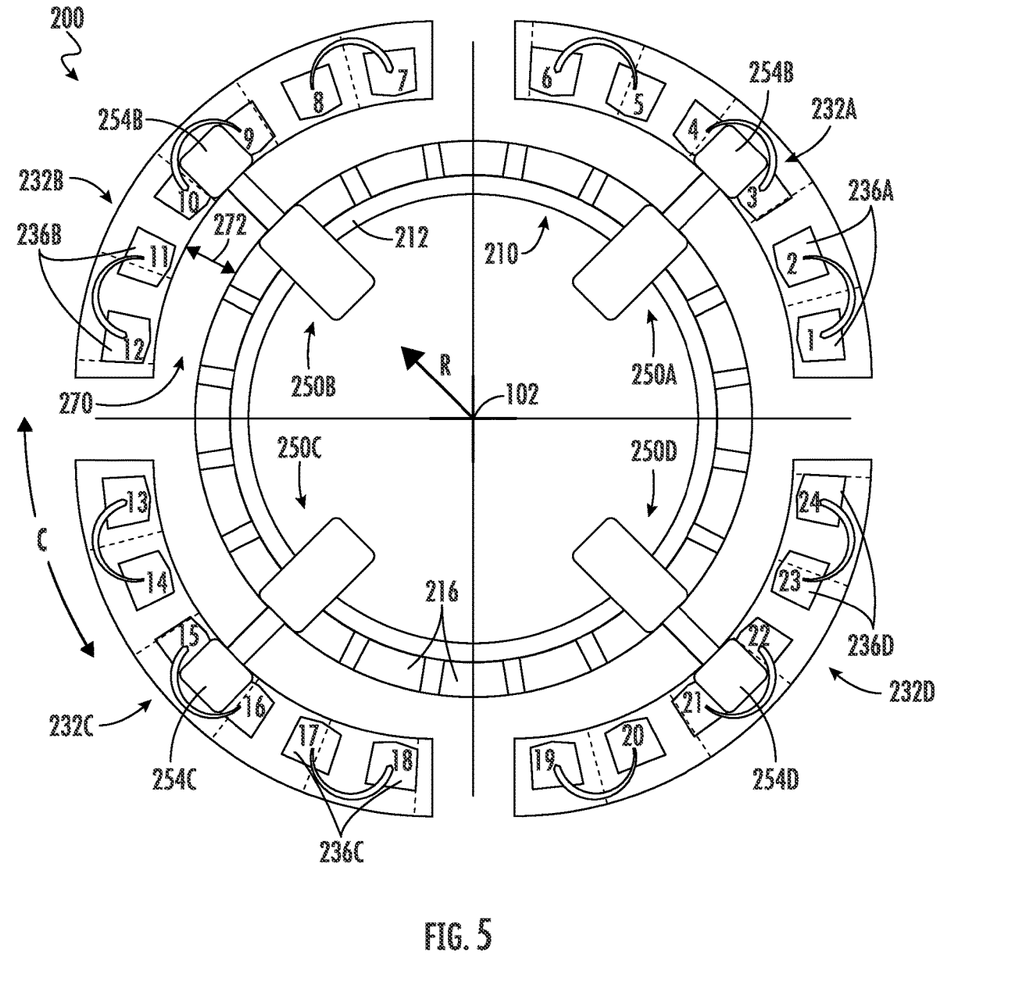
FIG. 5 is a schematic axial view of the electric machine of FIG. 2 depicting the stator segments thereof in their respective second positions.

As shown best in FIG. 4, each one of the stator segments 232A, 232B, 232C, 232D has at least one associated power converter 260A, 260B, 260C, 260D. Each of the power converters 260A, 260B, 260C, 260D are electrically coupled with the stator windings 236A, 236B, 236C, 236D of their respective stator segments 232A, 232B, 232C, 232D. As one example, the power converters 260A, 260B, 260C, 260D can each be operable to convert the electrical power generated by the electric machine 200 from Alternating Current (AC) into Direct Current (DC) and/or to convert incoming electrical power provided to the electric machine 200 from DC to AC.

As will be appreciated by comparing the position of the stator segments 232A, 232B, 232C, 232D in FIG. 4 with their respective positions in FIG. 5, each one of the stator segments 232A, 232B, 232C, 232D is movable between a first position (shown in FIG. 4) and a second position (shown in FIG. 5). FIGS. 2 and 3 show a different perspective of the first stator segment 232A movable between the first position (FIG. 2) and the second position (FIG. 3). Notably, the stator segments 232A, 232B, 232C, 232D are each movable between their respective first and second positions along the radial direction R. The stator segments 232A, 232B, 232C, 232D are each closer to the rotor assembly 210 when in their respective first positions than when in their respective second positions. In some instances, each of the stator segments 232A, 232B, 232C, 232D can be moved to an intermediate position between their respective first and second positions.

The stator segments 232A, 232B, 232C, 232D are each movable along the radial direction R relative to the rotor assembly 210 by actuators. As shown best in FIGS. 4 and 5, each stator segment has an actuator associated therewith. Particularly, the first stator segment 232A has a first actuator 250A associated therewith, the second stator segment 232B has a second actuator 250B associated therewith, the third stator segment 232C has a third actuator 250C associated therewith, and the fourth stator segment 232D has a fourth actuator 250D associated therewith. Each of the actuators 250A, 250B, 250C, 250D are operable to move their respective stator segments 232A, 232B, 232C, 232D along the radial direction R between their respective first and second positions or to an intermediate position therebetween.

The first actuator 250A is coupled to the first stator segment 232A for moving the first stator segment 232A relative to the rotor assembly 210 along the radial direction R, e.g., between the first position and the second position. For this embodiment, the first actuator 250A is a linear actuator. The first actuator 250A includes a base 252A and an extension portion 254A moveable relative to the base 252A along the radial direction R. The base 252A is coupled or attached to the stator connection member 234 as shown in FIGS. 2 and 3. The extension portion 254A is coupled or attached to the first stator segment 232A. In a similar manner, the second actuator 250B is coupled to the second stator segment 232B for moving the second stator segment 232B relative to the rotor assembly 210 along the radial direction R, e.g., between the first position and the second position. The second actuator 250B is also a linear actuator and includes a base 252B and an extension portion 254B moveable relative to the base 252B along the radial direction R. Although not shown, the base 252B is coupled or attached to a stator connection member at a circumferentially-spaced location from where the base 252A of the first actuator 250A is coupled or attached to the stator connection member 234 as shown in FIGS. 2 and 3. The extension portion 254B is coupled or attached to the second stator segment 232B.

Further, the third actuator 250C is coupled to the third stator segment 232C for moving the third stator segment 232C relative to the rotor assembly 210 along the radial direction R, e.g., between the first position and the second position. The third actuator 250C is a linear actuator and includes a base 252C and an extension portion 254C moveable relative to the base 252C along the radial direction R. The base 252C can be coupled or attached to a stator connection member at a circumferentially-spaced location from where the base 252A of the first actuator 250A is coupled or attached to the stator connection member 234 as shown in FIGS. 2 and 3 and from where the base 252B of the second actuator 250B is coupled with its corresponding stator connection member. The extension portion 254C is coupled or attached to the third stator segment 232C. Similarly, like the other actuators, the fourth actuator 250D is coupled to the fourth stator segment 232D for moving the fourth stator segment 232D relative to the rotor assembly 210 along the radial direction R, e.g., between the first position and the second position. For this embodiment, the fourth actuator 250D is a linear actuator and includes a base 252D and an extension portion 254D moveable relative to the base 252D along the radial direction R. The base 252D is coupled or attached to a stator connection member at a circumferentially-spaced location from where the base 252A of the first actuator 250A is coupled or attached to the stator connection member 234 as shown in FIGS. 2 and 3 and from where the base 252B of the second actuator 250B is coupled with its corresponding stator connection member and from where the base 252C of the third actuator 250C is coupled with its corresponding stator connection member. The extension portion 254D is coupled or attached to the fourth stator segment 232D.

The actuators 250A, 250B, 250C, 250D can be powered in any suitable manner. For instance, the actuators 250A, 250B, 250C, 250D can be hydraulically powered, pneumatically powered, electrically powered, thermally activated, magnetically activated, etc. Further, still, in other embodiments, the actuators 250A, 250B, 250C, 250D may not be a linear actuator and instead may be a scissor-actuator, a circular to linear actuator (such as a screw actuator), or any other actuator capable of creating a linear movement.

Referring still to FIGS. 2, 3, 4, and 5, for the embodiment shown, when the stator segments 232A, 232B, 232C, 232D are positioned in their respective first positions as shown in FIGS. 2 and 4, they are each in an engaged position. When the stator segments 232A, 232B, 232C, 232D are positioned in their respective second positions as shown in FIGS. 3 and 5, they are each in a disengaged position. As used herein, the term "engaged position" refers to a relative positioning of the rotor 212 of the rotor assembly 210 to the stator 232 of the stator assembly 230 in which the electric machine 200 is capable of operating within a reasonable margin of error of the design efficiency for the electric machine 200. For example, in the engaged position, the air gap 270 defined between the rotor 212 of the rotor assembly 210 and the stator 232 of the stator assembly 230 may be within a reasonable margin of an optimal design value, enabling a desired portion of magnetic flux from the magnets 216 of the rotor 212 to reach the stator windings 236A, 236B, 236C, 236D of the stator segments 232A, 232B, 232C, 232D. By contrast, as used herein, the term "disengaged position" refers to a relative positioning of the rotor 212 of the rotor assembly 210 to the stator 232 of the stator assembly 230 in which the electric machine 200 is not capable of operating with a reasonable efficiency (e.g., with an efficiency less than 10% of a maximum efficiency).

When the stator segments 232A, 232B, 232C, 232D are positioned in their respective first or engaged positions as shown in FIGS. 2 and 4, a size of the air gap 270 (i.e., a distance 272 between a given stator segment and the rotor 212, shown in FIGS. 3 and 5) may be a first value. When the stator segments 232A, 232B, 232C, 232D are positioned in their respective second or disengaged positions as shown in FIGS. 3 and 5, the size of the air gap 270 may be a second value. In some embodiments, the second value is at least two times larger than the first value, such as at least four times larger than the first value, such as at least five times larger than the first value, such as up to 200 times larger than the first value, such as up to 100 times larger than the first value, such as up to 20 times larger than the first value. In some embodiments, the actuators 250A, 250B, 250C, 250D can move their respective stator segments 232A, 232B, 232C, 232D along the radial direction R between the engaged position and the disengaged position or vice versa with the distance being greater than 0.5 inches and less than 10 inches, such as greater than 1 inch and less than 5 inches.

An electric machine 200 configured as provided herein may provide for an extra layer of safety in the event of a failure or fault of the electric machine 200. More specifically, in the event of a short or other fault within the stator 232 of the stator assembly 230 (e.g., within one or more of the windings 236A, 236B, 236C, 236D), continued rotation of the rotor 212 of the rotor assembly 210 relative to the stator 232, when the rotor assembly 210 is in the engaged position relative to the stator assembly 230, may create excess heat, potentially damaging other components within the turbofan 100. By utilizing the actuators 250A, 250B, 250C, 250D to move their respective stator segments 232A, 232B, 232C, 232D from their respective engaged positions to their respective disengaged positions, the turbofan 100 can continue to operate without risking additional damage thereto. Such functionality may be particularly useful when the turbofan 100 is, e.g., an aeronautical gas turbine engine producing thrust for an aircraft.

In such a manner, the turbofan 100 can include a control system for controlling the position of the stator segments 232A, 232B, 232C, 232D relative to the rotor assembly 210. As shown best in FIGS. 2 and 3, the turbofan 100 and/or the electric machine 200 can include a controller 280, one or more sensors 282 (only one shown in FIGS. 2 and 3), and one or more controllable devices, such as the actuators 250A, 250B, 250C, 250D. The controller 280 is communicatively coupled with the one or more sensors 282 and each of the actuators 250A, 250B, 250C, 250D, e.g., via one or more suitable wired and/or wireless communication links.

The controller 280 includes one or more memory devices and one or more processors. The one or more memory devices can store information accessible by the one or more processors, including computer-executable instructions that can be executed by the one or more processors. The instructions can be any set of instructions that, when executed by the one or more processors, cause the one or more processors to perform operations, such as the operations provided herein. The controller 280 can be configured in accordance with the computing system 400 of FIG. 7. Although the controller 280 is depicted in FIGS. 2 and 3 at a location proximate to the electric machine 200, it will be appreciated that the controller 280 can be located at any suitable position within the turbofan 100, such as under a cowling. The controller 280 can also be positioned at a remote location with respect to the turbofan 100, e.g., within the fuselage of an aircraft to which the turbofan 100 is mounted. In some embodiments, the controller 280 can be a dedicated controller for controlling actuation of the stator segments 232A, 232B, 232C, 232D. In other embodiments, the controller 280 can be an Electronic Engine Controller (EEC) of a Full Authority Digital Engine Control (FADEC) system.

In some embodiments, the controller 280 is configured to receive data from the one or more sensors 282. The data can indicate a fault within or associated with the electric machine 200. For example, the one or more sensors 282 can be, e.g., one or more temperature sensors configured to sense a temperature of their respective stator segments 232A, 232B, 232C, 232D. If the data sensed by the one or more sensors 282 indicates that a temperature associated with one or more of the stator segments 232A, 232B, 232C, 232D is in excess of a certain threshold, such may be indicative of a fault within the electric machine 200. Accordingly, the controller 280 can determine that a fault is associated with the electric machine 200 and can cause the actuators 250A, 250B, 250C, 250D to move their respective stator segments 232A, 232B, 232C, 232D from their respective first or engaged positions outward along radial direction R away from the rotor assembly 210 to their respective second or disengaged positions. Stated another way, the controller 280 can cause the actuators 250A, 250B, 250C, 250D to move their respective stator segments 232A, 232B, 232C, 232D from their respective first or engaged positions to their respective second or disengaged positions along the radial direction R in response to receiving the data indicating the fault within the electric machine 200. In this way, in the event of a fault within or associated with the electric machine 200, damage to the electric machine 200 and/or other components of the turbofan 100 can be prevented or mitigated.

Further, in some embodiments, the controller 280 is configured to receive subsequent data indicating that the fault within or associated with the electric machine 200 has been remedied or is no longer present and/or a command that indicates the electric machine 200 is to operate despite the fault condition. Accordingly, in such embodiments, the controller 280 can cause the actuators 250A, 250B, 250C, 250D to move their respective stator segments 232A, 232B, 232C, 232D from their respective second or disengaged positions inward along radial direction R toward the rotor assembly 210 to their respective first or engaged positions. The subsequent data can be received from the one or more sensors 282, from an aircraft flight management system, a pilot, etc.

In addition to the above-noted functionality, it should be appreciated that the controller 280 can cause the actuators 250A, 250B, 250C, 250D to move their respective stator segments 232A, 232B, 232C, 232D along the radial direction R to one or more intermediate or partial power positions located between their respective first and second positions, or rather between their respective engaged and disengaged positions. In such a manner, the actuators 250A, 250B, 250C, 250D may be configured to move their respective stator segments 232A, 232B, 232C, 232D relative to the rotor assembly 210 in order to affect an efficiency of the electric machine 200, to effectively control an amount of power extracted by the electric machine 200.

Accordingly, in such embodiments, the controller 280 is configured to receive data indicating an electrical power demand. The electrical power demand can indicate the electrical power demanded by one or more electrical loads electrically coupled with the electric machine 200. The electrical power demand can be a demand requesting an increase in electrical power, a decrease in electrical power, or in some instances, a demand requesting the same electrical power as previously requested. In response to the electrical power demand, the controller 280 can cause the actuators 250A, 250B, 250C, 250D to move their respective stator segments 232A, 232B, 232C, 232D away from or toward the rotor assembly 210 along the radial direction R.

For instance, on one hand, if the electrical power demand is a demand requesting an increase in electrical power, the controller 280 can cause the actuators 250A, 250B, 250C, 250D to move their respective stator segments 232A, 232B, 232C, 232D toward the rotor assembly 210 along the radial direction R. The radial distance the stator segments 232A, 232B, 232C, 232D are moved toward the rotor assembly 210 along the radial direction R can be in accordance with a schedule that correlates the demanded electrical power with respective positions of the stator segments 232A, 232B, 232C, 232D and/or their associated actuators 250A, 250B, 250C, 250D, for example.

On the other hand, if the electrical power demand is a demand requesting a decrease in electrical power, the controller 280 can cause the actuators 250A, 250B, 250C, 250D to move their respective stator segments 232A, 232B, 232C, 232D away from the rotor assembly 210 along the radial direction R. The radial distance the stator segments 232A, 232B, 232C, 232D are moved away from the rotor assembly 210 along the radial direction R can be in accordance with the schedule that correlates the demanded electrical power with respective positions of the stator segments 232A, 232B, 232C, 232D and/or their associated actuators 250A, 250B, 250C, 250D, for example. If the electrical power demand is a demand requesting neither a decrease nor increase in electrical power, the controller 280 can cause the actuators 250A, 250B, 250C, 250D to maintain the positions of their respective stator segments 232A, 232B, 232C, 232D along the radial direction R.

Accordingly, advantageously, the controller 280 can control the radial position of each of the stator segments 232A, 232B, 232C, 232D relative to the rotor assembly 210 to control an amount of power extraction from the electric machine 200. In addition, the electrical power output by the electric machine 200 can be decoupled from the rotational speed of the rotating component to which the rotor assembly 210 is coupled, which is the LP shaft 136 in this example.

It will further be appreciated that the exemplary electric machine 200 and turbofan 100 depicted in FIGS. 1 through 5 is provided by way of example only. In other exemplary embodiments, the electric machine 200 and turbofan 100 may have any other suitable configuration. For example, in other exemplary embodiments, the electric machine 200 may be positioned in any other suitable location within the gas turbine engine. For example, a gas turbine engine can include an electric machine coupled to an LP shaft, an HP shaft, or both within the compressor section at a location forward of the HP compressor. Additionally or alternatively, the gas turbine engine can include an electric machine coupled to the LP shaft, the HP shaft, or both within the compressor section at a location inward of the HP compressor. Additionally or alternatively, the gas turbine engine can include an electric machine coupled with the LP shaft within the turbine section, e.g., at a location forward of the LP turbine. Other suitable locations are possible.

Figure 6:
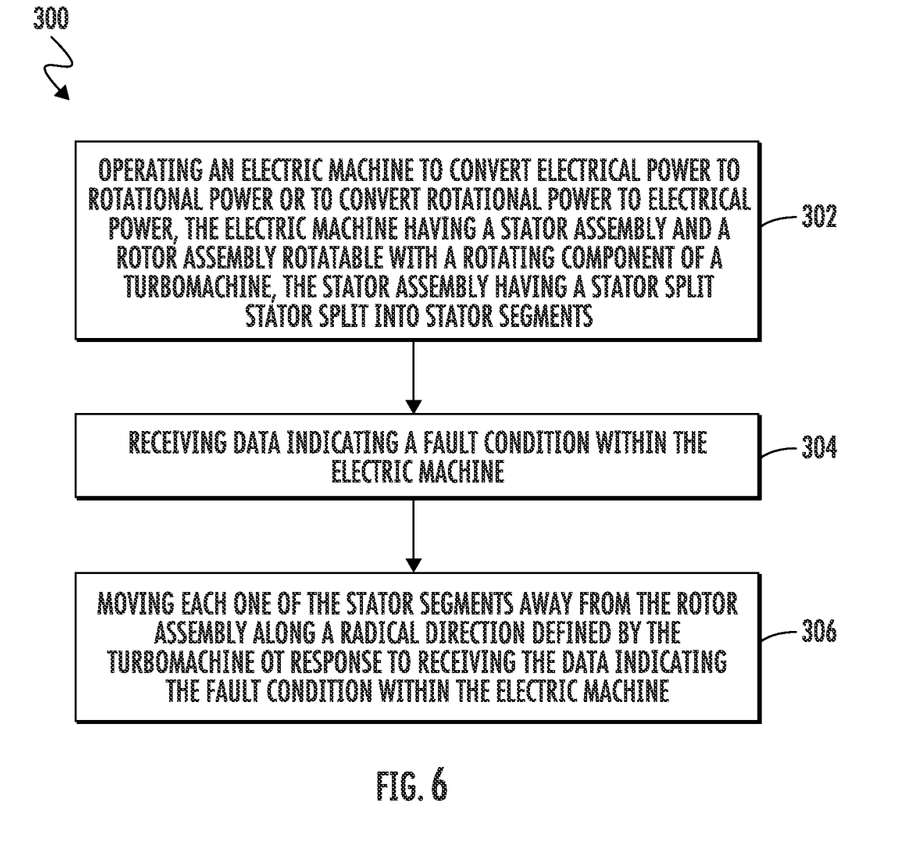
FIG. 6 is a flow diagram for a method of operating an electric machine in accordance with an exemplary aspect of the present disclosure.

Referring now to FIG. 6, a flow diagram for a method (300) of operating a turbomachine in accordance with an exemplary aspect of the present disclosure is depicted. In certain exemplary aspects, the method (300) may utilize the electric machine 200 provided herein. Accordingly, in certain exemplary aspects the electric machine may include a stator assembly and a rotor assembly, and may define a centerline. Furthermore, the control system described herein can be used to implement all or certain aspects of the method (300). The turbomachine can be any suitable turbomachine, such as an aviation gas turbine engine.

At (302), the method (300) includes operating an electric machine to convert electrical power to rotational power or to convert rotational power to electrical power. The electric machine has a stator assembly and a rotor assembly rotatable with a rotating component of a turbomachine. Notably, the stator assembly has a stator split into stator segments. In some implementations, for instance, the stator assembly can be split or segmented into at least two segments. In some implementations, the stator assembly can be split or segmented into at least four segments. Moreover, in some implementations, the turbomachine is an aviation gas turbine engine. In such implementations, the rotating component can be one of a low pressure shaft and a high pressure shaft of the aviation gas turbine engine. Further, in such implementations, operating the electric machine to convert rotational power to electrical power can occur during a flight operation, such as a takeoff operation, a climb operation, a cruise operation, and/or a descent operation, or alternatively, during a ground operation.

At (304), the method (300) includes receiving data indicating a fault condition within the electric machine. Receiving the data indicating the fault condition within the electric machine at (304) can include receiving sensor data indicative of a short within one or more stator windings or coils associated with one of the stator segments. For example, receiving information indicative of the fault condition within the electric machine at (304) can include receiving data indicative of a temperature of one or more aspects of the stator assembly.

At (306), the method (300) includes moving each one of the stator segments away from the rotor assembly along a radial direction defined by the turbomachine in response to receiving the data indicating the fault condition within the electric machine. For instance, the stator segments can be moved outward along the radial direction from their respective first or engaged positions to respective second or disengaged positions, wherein the stator segments are each positioned closer to the rotor assembly when in their respective first positions than when in their respective second positions. This can increase the air gap or distance between the stator segments and the rotor assembly.

In some implementations, the stator segments are movable between their respective first and second positions simultaneously. In some implementations, the stator segments are each separately movable between their respective first and second positions, e.g., by associated actuators. In some implementations, the stator segments are each moved away from the rotor assembly along the radial direction a distance that is greater than 0.5 inches and less than 10 inches.

Further, in some implementations, the stator is split or segmented into a first stator segment and a second stator segment. In such implementations, moving each one of the stator segments away from the rotor assembly along the radial direction includes moving the first stator segment and the second stator segment opposite one another along the radial direction. In other implementations, the stator is split or segmented into a first stator segment, a second stator segment, a third stator segment, and a fourth stator segment, e.g., as shown in FIGS. 4 and 5. In such implementations, moving each one of the stator segments away from the rotor assembly along the radial direction includes moving the first stator segment and the third stator segment opposite one another along the radial direction and the second stator segment and the fourth stator segment opposite one another along the radial direction. In this manner, each of the stator segments is moved away from the rotor assembly along the radial direction opposite of an opposing segment.

Additionally or alternatively, it should be appreciated that the method (300) may be configured to additionally move the stator segments relative to the rotor assembly along the radial direction to respective intermediate positions between their respective first and second positions, or rather between their respective engaged and disengaged positions. In such manner, the method (300) can also be implemented to affect the efficiency of the electric machine so as to effectively control an amount of power extracted by the electric machine (or provided to an engine including the electric machine).

In such manner, a controller associated with the electric machine may further be configured to move the stator segments relative to the rotor assembly along the radial direction to control an amount of power extraction from the electric machine or power provided to an engine including the electric machine. For example, the controller associated with the electric machine may determine that additional power extraction is required or desired, and in response may move the stator segments to reduce the air gap and increase a power extraction. Additionally or alternatively, the controller associated with the electric machine may determine that a lesser amount of power extraction is required or desired, and in response may move the stator segments to increase the air gap and reduce a power extraction. Additionally or alternatively, the controller associated with the electric machine may determine that additional power is required or desired to be provided to an engine including the electric machine, and in response may move the stator segments to reduce the air gap and increase a power provided to the engine. Additionally or alternatively still, the controller associated with the electric machine may determine that a lesser amount power is required or desired to be provided to the engine including the electric machine, and in response may move the stator segments to increase the air gap and reduce a power provided to the engine.

Figure 7:
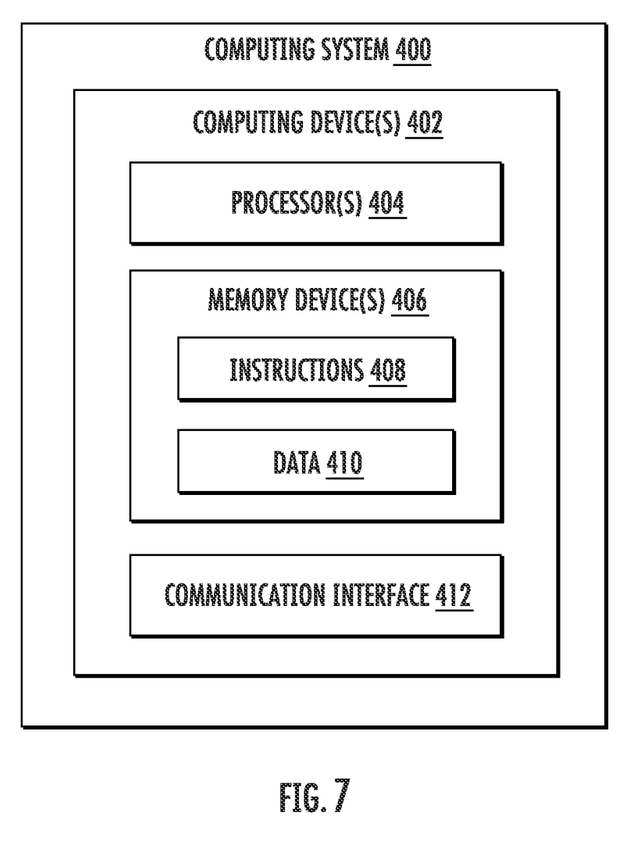
FIG. 7 is a block diagram of an example computing system that can be used to implement aspects of the present disclosure.

FIG. 7 provides a block diagram of the computing system 400 in accordance with exemplary aspects of the present disclosure. The computing system 400 is one example of a suitable computing system for implementing certain aspects of the present disclosure.

As shown in FIG. 7, the computing system 400 can include one or more processor(s) 404 and one or more memory device(s) 406. The one or more processor(s) 404 and one or more memory device(s) 406 can be embodied in one or more computing device(s) 402, such as the controller 280 provided herein. The one or more processor(s) 404 can include any suitable processing device, such as a microprocessor, microcontroller, integrated circuit, logic device, or other suitable processing device. The one or more memory device(s) 406 can include one or more computer-readable medium, including, but not limited to, non-transitory computer-readable medium or media, RAM, ROM, hard drives, flash drives, and other memory devices, such as one or more buffer devices.

The one or more memory device(s) 406 can store information accessible by the one or more processor(s) 404, including computer-readable instructions 408 that can be executed by the one or more processor(s) 404. The instructions 408 can be any set of instructions that, when executed by the one or more processor(s) 404, cause the one or more processor(s) 404 to perform operations. The instructions 408 can be software written in any suitable programming language or can be implemented in hardware. The instructions 408 can be any of the computer-readable instructions noted herein.

The memory device(s) 406 can further store data 410 that can be accessed by the processor(s) 404. For example, the data 410 can include received data from the one or more sensors 282 (FIGS. 2 and 3). Further, the data 410 can include one or more table(s), function(s), algorithm(s), model(s), equation(s), etc. according to example embodiments of the present disclosure.

The one or more computing device(s) 402 can also include a communication interface 412 used to communicate, for example, with other systems or devices, e.g., the actuators 250A, 250B, 250C, 250D. The communication interface 412 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Additional exemplary aspects will be described below with respect to the following clauses:

1. An electric machine defining an axial direction, a radial direction, and a centerline extending along the axial direction, the electric machine comprising: a rotor assembly rotatable about the centerline; and a stator assembly having a stator split into stator segments, each one of the stator segments being movable between a first position and a second position along the radial direction, the stator segments each being closer to the rotor assembly when in the first position than when in the second position.

2. The electric machine of any preceding clause, wherein the first position is an engaged position and the second position is a disengaged position.

3. The electric machine of any preceding clause, wherein each one of the stator segments has an associated set of stator windings, and wherein the stator windings of each set are wound only within their respective stator segments.

4. The electric machine of any preceding clause, wherein each stator segment has an associated power converter.

5. The electric machine of any preceding clause, wherein the stator segments are separately movable between their respective first and second positions.

6. The electric machine of any preceding clause, wherein the stator segments include at least four stator segments.

7. The electric machine of any preceding clause, the stator segments are each movable between their respective first and second positions along the radial direction a distance that is greater than 0.5 inches and less than 10 inches.

8. The electric machine of any preceding clause, wherein each stator segment has an actuator associated therewith, each of the actuators being operable to move their respective one of the stator segments between their respective first and second positions.

9. The electric machine of any preceding clause, wherein a controller associated with the electric machine and operatively coupled with the actuators is configured to cause the actuators to move their respective stator segments away from the rotor assembly from their respective first positions to their respective second positions in response to receiving data indicating a fault with the electric machine.

10. The electric machine of any preceding clause, wherein a controller associated with the electric machine and operatively coupled with the actuators is configured to cause the actuators to move their respective stator segments away from the rotor assembly to respective partial power positions located between their respective first and second positions.

11. The electric machine of any preceding clause, wherein each stator segment engages an adjacent one of the stator segments when the stator segments are in their respective first positions and are disengaged from one another in their respective second positions.

12. The electric machine of any preceding clause, wherein the rotor assembly includes a plurality of permanent magnets.

13. The electric machine of any preceding clause, wherein the stator segments are movable between their respective first and second positions simultaneously.

14. A turbomachine defining a radial direction, the turbomachine comprising: a rotating component; actuators; an electric machine, comprising: a rotor assembly rotatable with and operatively coupled with the rotating component; and a stator assembly having a stator split into stator segments, each one of the stator segments being movable by one of the actuators between a first position and a second position along the radial direction, the stator segments each being closer to the rotor assembly along the radial direction when in the first position than when in the second position.

15. The turbomachine of any preceding clause, further comprising: one or more sensors associated with the electric machine; and a controller associated with the electric machine and communicatively coupled with the actuators and the one or more sensors, the controller being configured to: receive, from the one or more sensors, data indicating a fault associated with the electric machine; and cause the actuators to move their respective stator segments away from the rotor assembly along the radial direction in response to receiving the data indicating the fault associated with the electric machine.

16. The turbomachine of any preceding clause, further comprising: a controller associated with the electric machine and communicatively coupled with the actuators, the controller being configured to: receive an electrical power demand that indicates electrical power demanded by one or more electrical loads electrically coupled with the electric machine; and cause the actuators to move their respective stator segments relative to the rotor assembly along the radial direction in response to receiving the electrical power demand.

17. The turbomachine of any preceding clause, wherein the turbomachine is an aviation gas turbine engine, and wherein the rotating component is one of a low pressure shaft and a high pressure shaft of the aviation gas turbine engine.

18. A method, comprising: operating an electric machine to convert electrical power to rotational power or to convert rotational power to electrical power, the electric machine having a stator assembly and a rotor assembly rotatable with a rotating component of a turbomachine, the stator assembly having a stator split into stator segments; receiving data indicating a fault condition within the electric machine; and moving each one of the stator segments away from the rotor assembly along a radial direction defined by the turbomachine in response to receiving the data indicating the fault condition within the electric machine.

19. The method of any preceding clause, wherein the stator segments include a first stator segment and a second stator segment, and wherein moving each one of the stator segments away from the rotor assembly along the radial direction comprises moving the first stator segment and the second stator segment opposite one another along the radial direction.

20. The method of any preceding clause, wherein the stator segments are moved away from the rotor assembly along the radial direction a distance that is greater than 0.5 inches and less than 10 inches.

What is claimed is:

1. An electric machine defining an axial direction, a radial direction, and a centerline extending along the axial direction, the electric machine comprising:
   a rotor assembly rotatable about the centerline;
   a stator assembly having a stator split into stator segments, each one of the stator segments having an actuator associated therewith, each of the actuators being operable to move their respective one of the stator segments between a first position and a second position along the radial direction, the stator segments each being closer to the rotor assembly when in the first position than when in the second position;
   a plurality of power converters, each of the plurality of power converters being electrically coupled to a respective stator segment of the stator segments; and
   a controller operatively coupled with the actuators and being configured to:
     receive data from one or more sensors associated with the electric machine;
     identify a fault with the electric machine based on the data; and
     operate the actuators to move their respective stator segments away from the rotor assembly from their respective first positions to their respective second positions in response to identifying the fault with the electric machine.

2. The electric machine of claim 1, wherein the first position is an engaged position and the second position is a disengaged position.

3. The electric machine of claim 1, wherein each one of the stator segments has an associated set of stator windings, and wherein the stator windings of each set are wound only within their respective stator segments.

4. The electric machine of claim 1, wherein the stator segments are separately movable between their respective first and second positions.

5. The electric machine of claim 1, wherein the stator segments include at least four stator segments.

6. The electric machine of claim 1, the stator segments are each movable between their respective first and second positions along the radial direction a distance that is greater than 0.5 inches and less than 10 inches.

7. The electric machine of claim 1, wherein the controller associated with the electric machine and operatively coupled with the actuators is configured to cause the actuators to move their respective stator segments away from the rotor assembly to respective partial power positions located between their respective first and second positions.

8. The electric machine of claim 1, wherein each stator segment engages an adjacent one of the stator segments when the stator segments are in their respective first positions and are disengaged from one another in their respective second positions.

9. The electric machine of claim 1, wherein the rotor assembly includes a plurality of permanent magnets.

10. The electric machine of claim 1, wherein the stator segments are movable between their respective first and second positions simultaneously.

11. A turbomachine defining a radial direction, the turbomachine comprising:
   a rotating component;
   actuators;
   an electric machine, comprising:
     a rotor assembly rotatable with and operatively coupled with the rotating component; and
     a stator assembly having a stator split into stator segments, each one of the stator segments having a respective actuator of the actuators associated therewith, each of the actuators being operable to move their respective one of the stator segments between a first position and a second position along the radial direction, the stator segments each being closer to the rotor assembly along the radial direction when in the first position than when in the second position;
     a plurality of power converters, each of the plurality of power converters being electrically coupled to a respective stator segment of the stator segments; and
   one or more sensors associated with the electric machine; and
   a controller associated with the electric machine and communicatively coupled with the actuators and the one or more sensors, the controller being configured to:
     receive data from the one or more sensors associated with the electric machine;
     identify a fault with the electric machine based on the data; and
     cause the actuators to move their respective stator segments away from the rotor assembly along the radial direction in response to identifying the fault with the electric machine.

12. The turbomachine of claim 11, wherein the controller is further configured to:
   receive an electrical power demand that indicates electrical power demanded by one or more electrical loads electrically coupled with the electric machine; and
   cause the actuators to move their respective stator segments relative to the rotor assembly along the radial direction in response to receiving the electrical power demand.

13. The turbomachine of claim 11, wherein the turbomachine is an aviation gas turbine engine, and wherein the rotating component is one of a low pressure shaft and a high pressure shaft of the aviation gas turbine engine.

14. A method, comprising:
operating an electric machine to convert electrical power to rotational power or to convert rotational power to electrical power, the electric machine having a stator assembly and a rotor assembly rotatable with a rotating component of a turbomachine, the stator assembly having a stator split into stator segments, wherein the conversion of electrical power is achieved using a plurality of power converters, each of the plurality of power converters being electrically coupled to a respective stator segment of the stator segments;
receiving data from one or more sensors associated with the electric machine;
identifying a fault with the electric machine based on the data; and
operate the actuators to move their respective stator segments away from the rotor assembly from their respective first positions to their respective second positions in response to identifying the fault condition withing the electric machine;
moving each one of the stator segments away from the rotor assembly along a radial direction defined by the turbomachine in response to identifying the fault condition within the electric machine.

15. The method of claim 14, wherein the stator segments include a first stator segment and a second stator segment, and wherein moving each one of the stator segments away from the rotor assembly along the radial direction comprises moving the first stator segment and the second stator segment opposite one another along the radial direction.

16. The electric machine of claim 1, wherein the one or more sensors comprises a temperature sensor and the fault is identified based on a measured temperature of the electric machine.

17. The electric machine of claim 16, wherein the measured temperature is a stator temperature.

18. The turbomachine of claim 11, wherein the one or more sensors comprises a temperature sensor and the fault is identified based on a stator temperature of the electric machine.

19. The method of claim 14, wherein the one or more sensors comprises a temperature sensor and the fault is identified based on a measured temperature of the electric machine.

* * * * *